Jan. 26, 1926.

E. ROYER 1,571,143

AUTOMATIC CONTROLLING DEVICE FOR COMPRESSORS SUPPLYING EXPLOSION ENGINES

Filed Oct. 23, 1925

E. Royer
INVENTOR

By Marks and Clerk
Attys

Patented Jan. 26, 1926.

1,571,143

UNITED STATES PATENT OFFICE.

EUGÈNE ROYER, OF PARIS, FRANCE, ASSIGNOR TO SOCIETE POUR L'EXPLOITATION DU SURALIMENTATEUR ROYER, OF PARIS, FRANCE.

AUTOMATIC CONTROLLING DEVICE FOR COMPRESSORS SUPPLYING EXPLOSION ENGINES.

Application filed October 23, 1925. Serial No. 64,447.

*To all whom it may concern:*

Be it known that I, EUGÈNE ROYER, of Paris, France, a citizen of the French Republic, have invented Automatic Controlling Devices for Compressors Supplying Explosion Engines (for which I have filed an application in France October 20, 1924), of which the following is a full, clear, and exact description.

Up to the present the problem of supercharging explosion engines has been solved by the use of a compressor definitely coupled to the engine and turning constantly with it, which arrangement had the disadvantage, in certain cases, of disturbing the carburation at mean speeds and during retarding and of absorbing a fraction of the power of the engine, which could not be recovered.

This invention relates to a device which overcomes these disadvantages by means of an automatic control bringing into action the compression apparatus at the exact moment when it becomes useful and efficient to employ it.

The invention consists essentially in the conjugation of the control of the compressor with that of one of the members regulating the power or the speed of the engine, the said conjugation being obtained in such a way as to produce the drive of the compressor by the engine towards the end of the stroke of the said member, that is to say only at the moment or at a moment approaching that at which the engine is working at full power or at high speeds.

According to the invention the compressor only enters into action when the maximum speed or power is demanded from the engine, necessitating an additional supply or a supercharge of carburetted air; on the other hand, when the engine is working at mean speeds, the compressor is at rest.

For the convenient embodiment of the invention the member or members, rollers, pinions, screws, belts, etc., for driving the super-charging compressor may be connected in any way to any one of the parts of the engine which control the regulation of its power or of its speed, in order to render automatic the bringing into action or placing out of action of the compressor.

The invention also relates to constructional devices characterized by a set of levers and rods combined so as to be controlled by the accelerating lever or pedal and in order to produce at the end of the stroke of the latter the displacement of the compressor and thus produce the engagement (by friction or other means) of its driving pulley, roller or pinion with the flywheel or other member of the engine, or with a member put in motion by the latter.

The invention may be applied to all types and systems of explosion or internal combustion engines, two or four stroke, whatever be their use: land locomotion, aviation, navigation, movable, stationary or transportable engines, etc.

The accompanying drawing illustrates by way of example two constructional arrangements of the invention.

Figure 1:
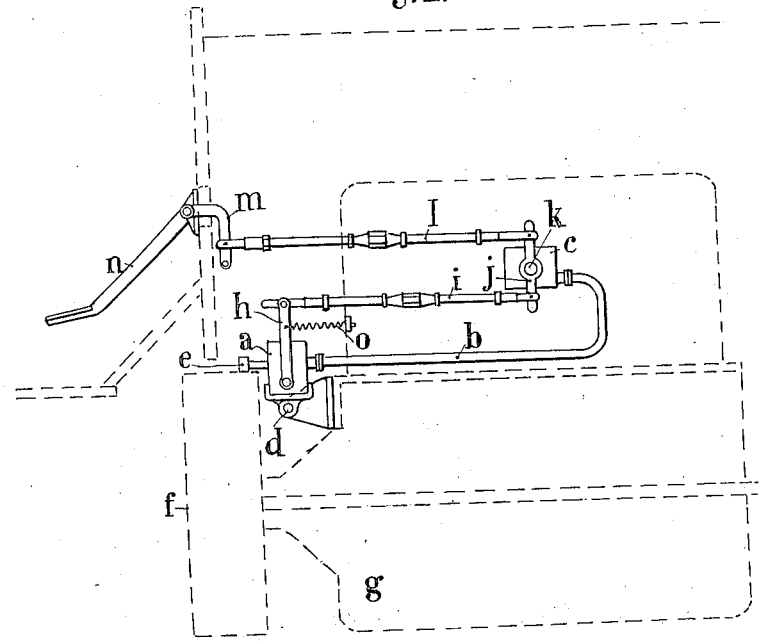
Figure 1 shows the form of construction of the invention in the case of its application to an automobile explosion engine.

In the form of construction shown in Figure 1 the air compressor $a$, connected by a pipe $b$ to the carburettor $c$ of the engine is adapted to oscillate about a shaft $d$ in such a way that its driving roller $e$ can be brought into contact with the flywheel $f$ of the engine $g$ at the moment the compressor $a$ has to enter into action, or be separated from it during the periods of working of the engine when the compressor $a$ must not act. The compressor $a$ is provided with an arm $h$ connected by a rod $i$, provided with a length-adjusting means, to a lever $j$ movable at $k$ upon the carburettor and controlling the accelerator. This lever $j$ is controlled by a rod $l$ the length of which may be adjusted, attached to the end of an arm $m$, attached to the accelerating pedal $n$.

The compressor $a$ is acted upon by a return spring $o$ which tends to keep it, at normal times, in a position such that its driving roller $e$ is out of contact with the flywheel $f$ of the engine.

The adjustment of the members of the controlling device $h$, $i$, $j$, $l$, $m$, described above is such that the lowering of the pedal $n$ controlling the gases has the effect of producing, first of all, only the gradual opening of the gas-admission valve, without communicating any movement to the compressor *a*, then, at the end of its stroke, to cause the latter to oscillate about its shaft *d* and bring the driving roller *e* of this compressor into contact with the flywheel *f* of the engine. As a result of this, at that moment when the gas admission valve is fully open the compressor *a* is brought into position and compressed air is supplied by the latter to the carburettor *c*.

The compressor *a* thus does not enter into action until the moment the maximum speed and power are demanded from the engine necessitating an additional supply or a super-charge of carburetted air.

On the other hand when the engine is working at mean speeds, the compressor is at rest. As a consequence of this it only undergoes a very small amount of wear so that it lasts for a long time in use.

Figure 2:
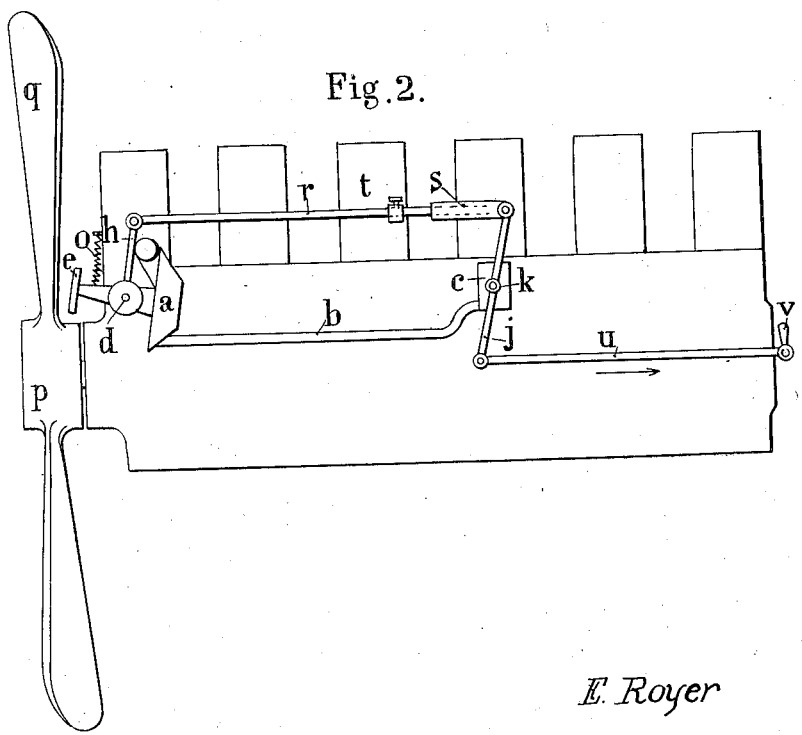
Figure 2 shows a second form of construction of the invention in the case of its application to an air-craft engine.

In the form of construction shown in Figure 2 and with regard to the application of the invention to an aircraft engine, the compressor *a* may oscillate about a shaft *d* arranged in such a way that its driving roller *e* may be brought into contact with the nave *p* of the propeller *q* moved by the engine, or with a friction flywheel or disc provided for this purpose.

The angular displacement of the compressor is controlled by a device similar to the one described above. As in the previous case the compressor *a* is provided with an arm *h* connected by an adjustable rod to the lever *j* movably mounted at *k* upon the carburettor and controlling the acceleration; this adjustable rod comprises a rod *r* pivotally connected to the end of the arm *h* provided upon the compressor, and a sleeve *s* which is adapted to slide upon the rod *r* pivotally connected to the lever *j* controlling the acceleration; the rod *r* is provided with an adjustable stop *t* against which abuts the end of the sleeve *s* at the moment when the gas-admission valve is completely open, or is in a position adjacent to its open position, and the compressor has to enter into action.

The lever *j* controlling the acceleration is actuated in the usual manner by a rod *u* adapted to be displaced longitudinally and provided at its ends with an actuating lever *v*.

Between the sleeve *s* and the stop *t* may also be provided a compression spring in order to facilitate adjustment, compensate for wear and limit the force of application.

By means of a suitable adjustment of the parts of the constructional arrangement described above, the displacement of the actuating rod *u* in the direction of the arrow shown in Figure 2 has the effect of producing, as in the previous case, during a part of its stroke, through the medium of the lever *j*, only the partial opening of the gas valve, without communicating any movement to the compressor *a* which is maintained in its position of rest by its returning spring *c*.

By continuing the pull upon the actuating rod *u*, the sleeve *s*, driven by the lever *j*, abuts, at the moment when the gas valve is brought into the position adjacent to its full opening, against the stop *t* carried by the rod *r*, or against the interposed spring, and in its movement carries along this rod, which through the medium of the arm *h* communicates a displacement to the compressor *a* and brings the driving roller *e* of the latter into contact with the nave *p* of the propeller *q*; from this moment the compressor *a* is brought into action and supplies air to the carburetter *c*.

When there is any occasion to reduce the speed and power of the engine the actuating rod *u* is pushed back so that it is moved in the opposite direction of the arm shown in Figure 2; the lever *j* then effects the gradual closing of gas valve and, as soon as this movement has commenced, the compressor *a* is brought into its position of rest by its return spring *o*.

Naturally the forms of construction described above are only given by way of example, the details of construction of the control rods and levers as well as the method employed for the displacement of the compressor in order to effect its engagement with the driving member may be modified in any suitable manner according to the types of engines and the various applications.

Having now particularly described and ascertained the nature of my said invention and in what manner the same is to be performed, I declare that what I claim is:—

1. In combination, an internal combustion engine having a driven element, a carbureter for furnishing air and fuel to the engine and provided with a throttle valve actuating member, manumotive means operatively connected to said member to permit the throttle to be controlled by the operator, a normally inoperative air compressor having a driven element, a conduit connecting the compressor to the carbureter to permit the compressor to furnish compressed air to the carbureter, and means operatively connecting said member to the compressor for causing the driven elements to engage one another only after the manumotive means has moved said member sufficiently to substantially fully open the carbureter throttle, whereby the driven element of the engine actuates the driven element of the compressor only after the throttle of the carbureter has been opened substantially completely.

2. In combination, an internal combustion engine having a driven element, a carbureter for furnishing a mixture of air and fuel to the engine and provided with a throttle valve actuating member, manumotive means connected to said member for controlling the latter, a movably mounted compressor having a driven element adapted to be actuated by the driven element of the engine when the compressor is moved into the proper position, a conduit connecting the compressor to the carbureter to permit the compressor to furnish compressed air to the carbureter, and means operatively connecting said member to the compressor for moving the compressor and causing engagement of said driven elements only when the manumotive means has moved the throttle valve to substantially completely open position.

3. In combination, an internal combustion engine having a driven element, a carbureter for furnishing a mixture of air and fuel to the engine and having a throttle valve actuating member, manumotive means operatively connected to said member for controlling the throttle valve of the carbureter, a pivotally mounted air compressor having a driven element adapted to be brought into engagement with the driven element of the engine, a conduit connecting the compressor to the carbureter for conveying compressed air from the compressor to the carbureter, and means operatively connecting said member to the compressor for causing the compressor to swing about its pivot and its driven element to engage the driven element of the engine only when said member has been moved a predetermined distance.

4. In combination, an explosive engine having a driven element, a carbureter for furnishing a mixture of air and fuel to the engine and provided with a throttle valve actuating member, manumotive means operatively connected to said member to permit the operator to control the throttle valve of the carbureter, a normally inoperative air compressor pivotally mounted relatively to the engine and having a driven element adapted to be brought into engagement with the driven element of the engine when the compressor is swung in one direction about its pivot, a conduit connecting the compressor and carbureter to permit the compressor to furnish compressed air to the carbureter when the engine is speeded up, and connecting means joining said member to the compressor for causing the compressor to be swung about its pivot and its driven element to be engaged by the driven element of the engine only when said member has been moved a predetermined distance by said manumotive means.

5. A combination as claimed in claim 4 in which the manumotive means includes lengthwise adjustable links.

6. A combination as claimed in claim 4 in which the connecting means includes lengthwise adjustable links.

7. In combination, an explosive engine having a rotary driven element, a carbureter for furnishing a mixture of air and fuel to the engine and provided with a throttle valve actuating member, a manumotive lever, a link connecting the lever to said member, a pivotally mounted air compressor having a rotary driven element adapted to be brought into engagement with the driven element of the engine when the compressor is swung in one direction about its pivot, means for moving the compressor in the opposite direction, a conduit connecting the compressor to the carbureter to permit the compressor to furnish compressed air to the carbureter when the engine is speeded up, a lever fixed to the compressor, and a link connecting said member to the last mentioned lever for causing the compressor to be swung toward the driven element of the engine when the manumotive lever is actuated and to bring the driven elements into engagement only when the manumotive lever has been moved a sufficient distance to cause the throttle valve to open a predetermined amount.

The foregoing specification of my automatic controlling device for compressors supplying explosion engines signed by me this 7th day of October, 1925.

EUGÉNE ROYER.